United States Patent
Takahashi

(10) Patent No.: US 6,168,417 B1
(45) Date of Patent: Jan. 2, 2001

(54) VERTICAL MOLDING MACHINE PROVIDED WITH PRE-PLASTICATION INJECTION UNIT

(75) Inventor: Nobusuke Takahashi, Nagano-ken (JP)

(73) Assignee: Nissei Plastics Industrial Co., Ltd. (JP)

( * ) Notice: Under 35 U.S.C. 154(b), the term of this patent shall be extended for 0 days.

(21) Appl. No.: 09/174,395

(22) Filed: Oct. 14, 1998

(30) Foreign Application Priority Data

Oct. 16, 1997 (JP) .................................................. 9-283706

(51) Int. Cl.[7] .................................................. B29C 45/62
(52) U.S. Cl. .................................................. 425/557; 425/561
(58) Field of Search .................................................. 425/557, 558, 425/559, 560, 561, 562

(56) References Cited

U.S. PATENT DOCUMENTS

| | | | |
|---|---|---|---|
| 3,807,924 | * | 4/1974 | Mingotti .............................. 425/245 |
| 3,852,010 | * | 12/1974 | Hehl ..................................... 425/192 |
| 4,278,354 | * | 7/1981 | Hehl ..................................... 366/78 |
| 4,589,839 | * | 5/1986 | Kurumaji et al. ..................... 425/547 |
| 5,744,172 | * | 4/1998 | Todaka et al. ....................... 425/113 |
| 5,863,567 | * | 1/1999 | Klaus ................................... 425/145 |
| 5,914,139 | * | 6/1999 | Matsubayashi et al. ............. 425/145 |

* cited by examiner

Primary Examiner—Harold Pyon
Assistant Examiner—Emmanuel Luk
(74) Attorney, Agent, or Firm—Ostrolenk, Faber, Gerb & Soffen, LLP

(57) ABSTRACT

A vertical molding machine vertically provided with a pre-plastication injection unit where an injection unit and a plastication unit are mounted side by side. The tips of these units are linked by a connecting pipe to transfer resin plasticated by the plastication unit to the injection unit therethrough. The injection unit and the plastication unit are individually supported by respective pairs of supports standing upright above a clamping device. The injection unit has an arm member on either side thereof and a spring member is provided on the top of the arm member. The plastication unit is held on the arm member through the spring member, where the supports for the plastication unit are inserted through the arm member and the spring member.

4 Claims, 3 Drawing Sheets

VERTICAL MOLDING MACHINE PROVIDED WITH PRE-PLASTICATION INJECTION UNIT

BACKGROUND OF THE INVENTION

1. Field of the Invention

The present invention relates to a vertical molding machine vertically provided with a pre-plastication injection unit where an injection unit and a plastication unit are mounted side by side, and more particularly to a vertical molding machine where a plastication unit is held by an arm member of an injection unit through a spring member.

2. Background Art

A conventional pre-plastication injection unit comprises an injection unit with an injection screw or plunger in a heating cylinder and a plastication unit with a plastication screw in another heating cylinder provided side by side and horizontally. Such a conventional pre-plastication injection unit has a connecting pipe that links the tips of both of these units which serves as a resin passage for the injection and plastication units. That is to say, the above-mentioned type of pre-plastication injection unit transfers resin molten and mixed by the plastication unit (the process of melting and mixing resin is hereinafter referred to as "plastication") from the plastication unit to the injection unit through the connecting pipe, meters the resin within the front portion of the heating cylinder of the injection unit and then injects the resin into a mold by the advance movement of the injection screw or plunger.

When the above-mentioned type of the pre-plastication injection unit is mounted horizontally on a machine base of a molding machine, the weight of the plastication unit never acts on the connecting pipe that links the tips of these units even if the plastication unit is placed above the injection unit.

On the other hand, if a clamping device is mounted vertically, the injection and plastication units need to be integrated into a single unit because they should be moved together simultaneously. At that time, the heating cylinders of these units expand differently due to different heating temperatures. Thus, there are problems such that the difference in expansion between both of the heating cylinders due to thermal expansion results in a great burden on both ends of the connecting pipe. Therefore, it is generally considered necessary to solve these problems when employing a pre-plastication injection unit for a vertical molding machine.

SUMMARY OF THE INVENTION

The present invention has been completed to solve the above-mentioned problems. Thus, it is an object of the present invention to provide a vertical molding machine that reduces the burden on the connecting pipe without significantly changing the configuration of a pre-plastication injection unit and a means for supporting the unit itself by employing a spring member to prevent damage to both ends of the connecting pipe.

It is a first aspect of the present invention to provide a vertical molding machine provided with a pre-plastication injection unit, comprising a pre-plastication injection unit comprising an injection unit with an arm member on the side thereof, a plastication unit held by the arm member and mounted next to the injection unit, and a connecting pipe linking the tip of the injection unit and the tip of the plastication unit, a clamping device, a pair of supports for supporting the injection unit mounted above the clamping unit, another pair of supports for supporting the plastication unit mounted above the clamping unit, and a spring member mounted on the arm member to hold the plastication unit, wherein the spring member reduces a burden on the above-mentioned connecting pipe which is caused by the dead weight of the plastication unit and the difference in thermal expansion between the heating cylinders of both units.

According to the above-mentioned configuration, the plastication unit is vertically held in a free state against the injection unit, and the spring member springy presses the plastication unit upward. Therefore, the spring force of the spring member offsetting the weight of the plastication unit eliminates a burden on the connecting pipe.

In addition, any difference in thermal expansion between the heating cylinders of both units is offset by the spring member. This eliminates a burden on the connecting pipe which is caused by a difference in thermal expansion and helps to reduce the possibility of damage of both ends of the connecting pipe, thus keeping the connecting pipe rigid even if the molding machine is operated for long periods. This also enables the characteristics of conventional horizontal pre-plastication injection units to be used effectively even if employed for vertical molding machines.

It is a second aspect of the present invention to provide a vertical molding machine provided with a pre-plastication injection unit according to the first aspect of the present invention, wherein the supports for the plastication unit are inserted through the arm member and the spring member to support the plastication unit.

According to the above-mentioned configuration, the spring force of the spring member acts in a correct direction since the supports are inserted through the arm member and the spring member to support the plastication unit.

It is a third aspect of the present invention to provide a vertical molding machine provided with a pre-plastication injection unit according to the first or second aspect of the present invention, wherein the spring force of the spring member is adjustable by a spring-force adjusting member for adjusting the spring force of the spring member.

According to the above configuration, the spring force of the spring member is made adjustable and it is possible to accurately correct the dislocation of the plastication unit due to a change in weight or thermal expansion.

BRIEF DESCRIPTION OF THE DRAWINGS

These and other objects and advantages of the present invention will become clear from the following description with reference to the accompanying drawings, wherein.

DETAILED DESCRIPTION OF THE PREFERRED EMBODIMENTS

Figure 1:
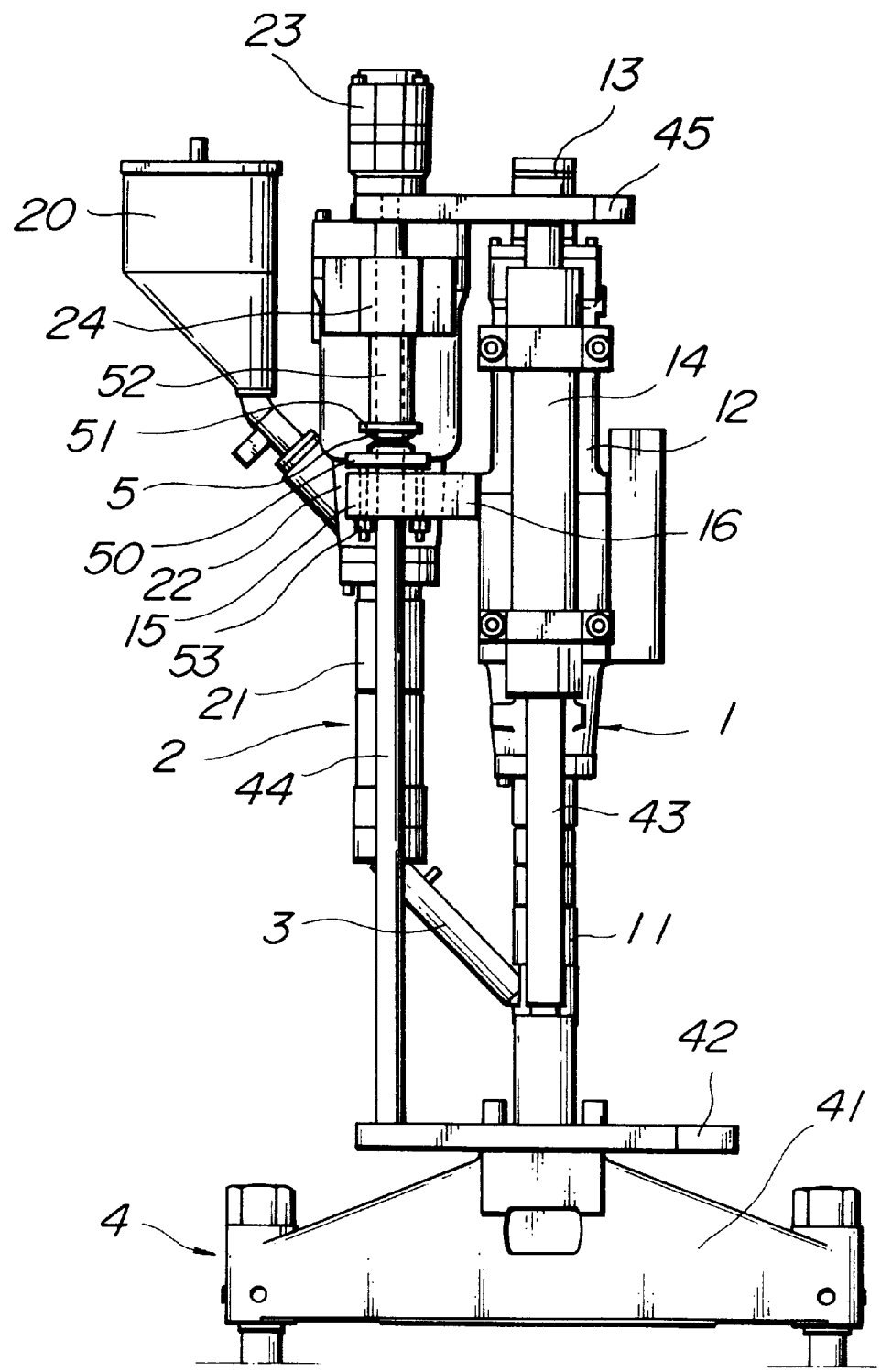
FIG. 1 is a front view of a vertical molding machine provided with a pre-plastication injection unit according to the present invention.
Figure 2:
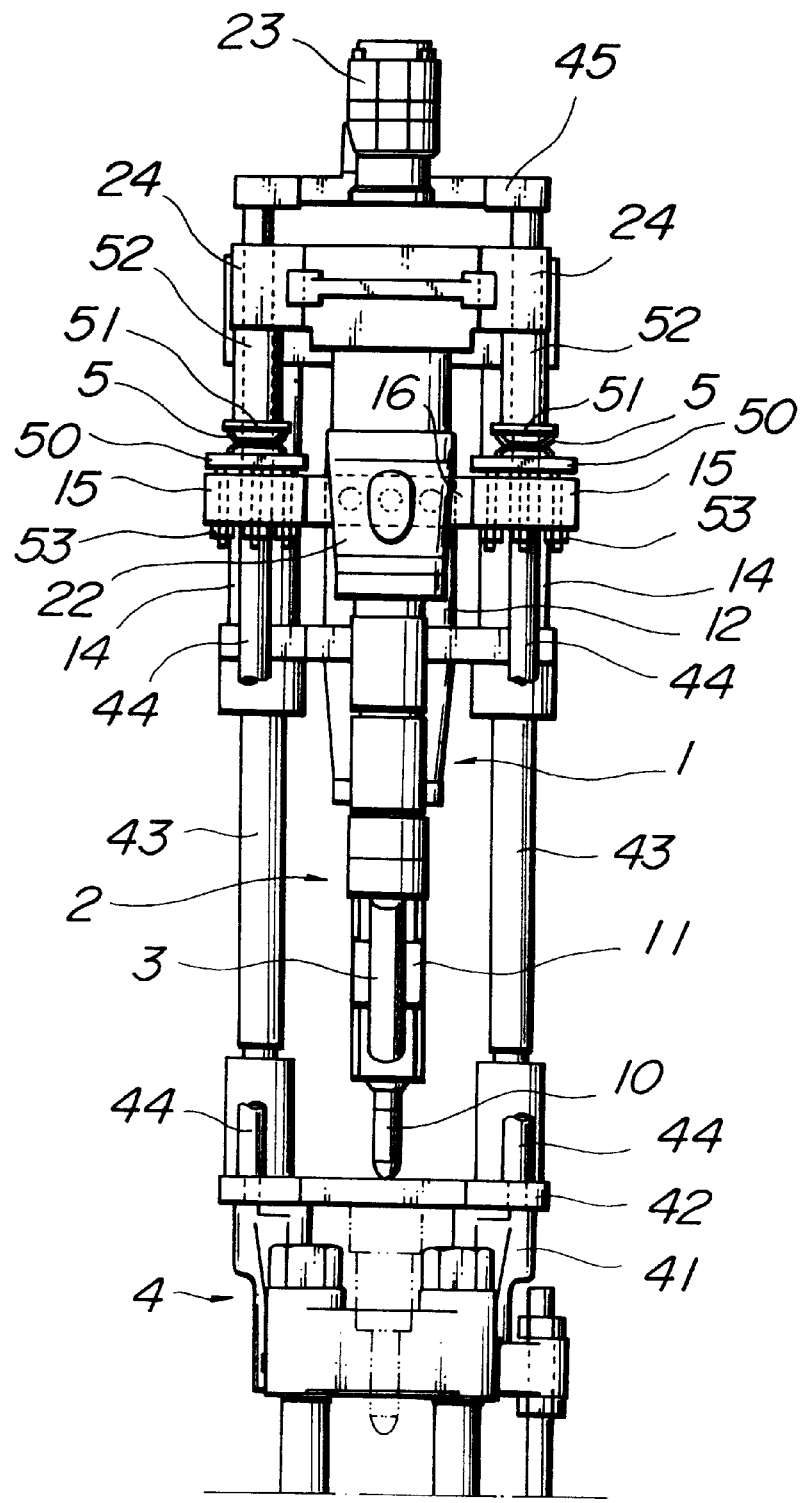
FIG. 2 is a side view, with portions broken away from the plastication unit, of a vertical molding machine provided with a pre-plastication injection unit according to the present invention.
Figure 3:
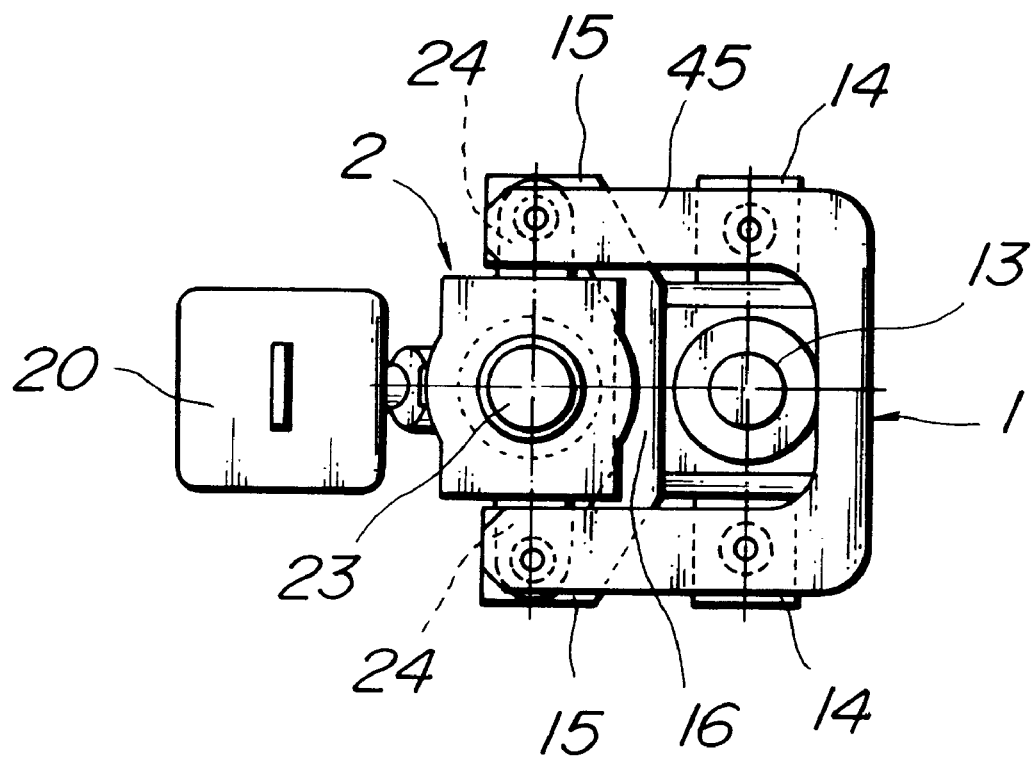
FIG. 3 is a plan view of a vertical molding machine provided with a pre-plastication injection unit according to the present invention.

The present invention is described in detail hereinafter with reference to embodiment(s) shown in the accompanying drawings.

An injection unit 1 comprises a heating cylinder 11 with a nozzle 10 at the tip thereof and an injection cylinder 12 mounted behind the heating cylinder 11, which are integrated into a single unit. The heating cylinder 11 holds inside an injection screw or injection plunger (not shown) which is connected to a ram inside the injection cylinder so that the injection screw can turn, advance, and retreat freely. In case of the injection screw, a motor 13 is mounted on the end of the said injection cylinder 12.

A plastication unit 2 comprises a heating cylinder 21 and a cylinder 22 with a hopper 20 on the side thereof, which is located behind the heating cylinder, in which they are integrated into a single unit. The heating cylinder holds a plastication screw (not shown) inside so that the plastication screw can turn freely. A motor 23 for the plastication screw is mounted on the end of the cylinder 22.

The above-mentioned injection unit 1 and the plastication unit 2 are connected to each other by a connecting pipe 3 that is slantwise provided to link the tip of the heating cylinder 11 and the tip of the heating cylinder 21. Resin plasticated by the plastication unit 2 is passed through the connecting pipe 3 serving as a resin passage and fed into the front portion of the heating cylinder 11 of the injection unit 1. The resin fed is metered and then injected into a mold (not shown) by the advance movement of the injection screw. A band heater for keeping the resin plasticated may be mounted around the connecting pipe 3.

A seat plate 42 is placed horizontally and fixed on a fixed platen 41 of a clamping device 4. The injection unit 1 and the plastication unit 2 are individually supported and inserted by respective pairs of supports 43 and 44 standing upright and mounted on the seat plate 42 at a required interval to be mounted vertically above the clamping device 4 next to each other in a free state. The supports 43 and 44 have the top ends connected in one body by means of a U-shaped connecting plate 45, for example, and support both of the units vertically. In addition, the injection unit 1 has a pair of arm members 15 that extend horizontally beyond the side of the injection cylinder 12. The above-mentioned support 44 for the plastication unit is inserted through the arm member 15.

In the embodiment shown in Figures, the supports 43 are inserted through respective hydraulically operable nozzle touch cylinders 14 mounted on either side of the injection unit 1 and also serves as piston rods. In this configuration, the injection unit 1 is moved up and down together with the nozzle touch cylinder 14 by the movement of the cylinder 14. In addition, in the embodiment shown, the arm members 15 are formed as a U-shaped member 16 bolted to the side of the injection cylinder 12. It is also possible to provide separate arm members at either side of the injection cylinder 12 as the arm members 15.

A spring member 5 is provided on the top the arm member 15. In the embodiment shown, the spring member 5 comprises a plurality of coned disc springs and is placed between a bottom seat 50 and a top seat 51 provided on the arm member 15. In addition, a spring-force adjusting member 53 penetrates the arm member 15 from the bottom side thereof to be in contact with the bottom seat 50. In the embodiment shown, the spring-force adjusting member 53 composed of bolts screwed is in contact with the bottom seat 50 and is designed to adjust the spring force of the spring member 5 through the bottom seat 50, as required, when the bolts are turned. This allows the adjustment of the spring force of the spring member and the correction of the dislocation of the plastication unit due to a change in weight or thermal expansion.

In addition, a tubular spacer 52 is provided on the top of the top seat 51. Above the spacer, an inserting part 24 of the plastication unit 2 is located on either side of the cylinder of the plastication unit 2. Therefore, these components, the bottom seat 50, the spring member 5, the top seat 51, and the spacer 52 are provided above the arm member 15 by being inserted by the support 44. The plastication unit 2 is held by the injection unit 1 through the spacer 52 and the spring member 5 in this manner. In addition, the spring force of the spring member acts in the correct direction since the support 44 is inserted through the arm member and the spring member.

The weight of the plastication unit 2 held as described above is received by the injection unit 1 through the spring member 5, thus the weight of the plastication unit 2 also does not act on the connecting pipe 3 that is in contact with the tip of the heating cylinder 21 since the spring member 5 springy presses the plastication unit 2 upward. Consequently, the dead weight of the plastication unit 2 imposes little or no resultant burden on the connecting pipe 3, thus helping to prevent damage to the ends of the connecting pipe due to concentrated loads thereon.

Both units do not interfere with each other in a vertical direction since the plastication unit 2 is mounted on the injection unit 1 by holding it in a free state. Consequently, any difference in thermal expansion between the heating cylinders 11 and 12 of both units is offset by the spring force of the spring member 5. This eliminates a burden on the connecting pipe 3 due to the difference in thermal expansion, thus keeping the connecting pipe rigid even if the molding machine is operated for long periods.

While the presently preferred embodiments of the present invention have been shown and described, it will be understood that the present invention is not limited thereto, and that various changes and modifications may be made by those skilled in the art without departing from the scope of the invention as set forth in the appended claims.

What is claimed is:

1. A vertical molding machine provided with a pre-plastication injection unit comprising:

a clamping device;

a pre-plastication injection unit comprising an injection unit and a plastication unit disposed vertically in side-by-side relationship and being connected by a pipe;

the said injection unit containing a heating cylinder, having a tip and having an arm member on a side thereof extending horizontally outwardly from such side thereof, said plastication unit containing a heating cylinder, having a tip and said plastication unit being held by said arm member, and said connecting pipe linking the tip of the injection unit and the tip of the plastication unit;

a first pair of supports extending vertically from the clamping device and supporting the injection unit;

a second pair of supports extending vertically from the clamping device and supporting the plastication unit; and a spring member disposed on the arm member so as to oppose the dead weight of the plastication unit on said connecting pipe and to counteract a difference in thermal expansion between the heating cylinders of the injection unit and the plastication unit.

2. A vertical molding machine provided with a pre-plastication injection unit as claimed in claim 1, wherein the supports for said plastication unit are inserted through said arm member and said spring member to support the plastication unit.

3. A vertical molding machine provided with a pre-plastication injection unit as claimed in claim 1, wherein spring force of said spring member is adjustable by a spring-force adjusting member for adjusting the spring force of the spring member.

4. A vertical molding machine provided with a pre-plastication injection unit as claimed in claim 2, wherein spring force of said spring member is adjustable by a spring-force adjusting member for adjusting the spring force of the spring member.

* * * * *